United States Patent [19]

Honsowetz et al.

[11] Patent Number: 5,767,590

[45] Date of Patent: Jun. 16, 1998

[54] CONTROLLING VEHICLE LIGHTING LOADS

[75] Inventors: Eric K. Honsowetz, Redford; Susan E. Viergever, Detroit, both of Mich.

[73] Assignee: UT Automotive Dearborn, Inc., Dearborn, Mich.

[21] Appl. No.: 786,425

[22] Filed: Jan. 21, 1997

[51] Int. Cl.$^6$ ...................................................... B60L 1/14
[52] U.S. Cl. ........................................ 307/10.8; 315/77
[58] Field of Search ................................ 307/10.8, 157,
307/10.1, 113, 125; 315/27, 324, 295, 224,
311, 208, 162, 291, 169.3, 169.1; 340/425.5,
438–467

[56] References Cited

U.S. PATENT DOCUMENTS

| | | | |
|---|---|---|---|
| 5,268,616 | 12/1993 | Dean et al. | 315/77 |
| 5,381,074 | 1/1995 | Rudzewicz et al. | 315/77 |
| 5,463,278 | 10/1995 | Gray | 315/169.1 |
| 5,563,622 | 10/1996 | Person et al. | 315/291 |

*Primary Examiner*—Richard T. Elms
*Attorney, Agent, or Firm*—Emch, Schaffer, Schaub & Porcello Co., L.P.A

[57] ABSTRACT

In the circuitry of this invention, variable DC voltage input is supplied to a pre-drive section through an input resistor. The value chosen for the resistor sets the base current which determines the gain of the pre-drive circuitry. The available gain controls the base current into the output driver which, in turn, supplies an output voltage to a load. The shape of the output curve is controlled by the available gain of both the pre-drive and drive circuitry. A control controls the pre-drive through a second resistor. The control also controls the power supplied to a second load through a second drive.

11 Claims, 2 Drawing Sheets

5,767,590

CONTROLLING VEHICLE LIGHTING LOADS

TECHNICAL FIELD

This invention relates to linear output drive circuitry that uses various gain levels to adjust the voltage output curve. The circuitry is especially useful in using one switch to control multiple functions.

BACKGROUND OF THE INVENTION

FIG. 1 is a prior art circuit diagram for a lighting system of a motor vehicle. FIG. 1 shows a conventional circuit using a 12 V battery as power supply 1. Lamp 2 represents the load and driver 3 energizes lamp 2. Driver 3 provides current to lamp 2 through transistor $TR_5$. Control 5, resistor $R_5$ controls the current to $TR_5$. This is a typical circuit for illuminating a VF (vacuum fluorescent) display such as a radio dial. When lamp 8 comprises panel lights in a dashboard, PWM circuitry 7, driving transistor $TR_6$ is used to drive load 8. In the prior art circuit, adjusting two output curves to obtain the same illumination on both circuits would not be possible.

DISCLOSURE OF THE INVENTION

This invention is an electrical circuit for a motor vehicle to control the illumination level of lighting loads which have different illumination to voltage transfer functions. The circuit claimed will allow the transfer function for the input means to output voltage to be adjusted to compensate for the difference in the transfer functions for each illumination load.

In the circuitry of this invention, a power supply such as a 12 volt battery supplies power to a pre-drive which in turn supplies power to drive which supplies power to a load. A variable DC voltage input controls the pre-drive through an input resistor. The value chosen for the resistor sets the base current which, along with the emitter resistor, determines the gain of the pre-drive circuitry. The available gain controls the base current into the output driver which, in turn, supplies an output voltage to a load. The shape of the output curve is controlled by the available gain of both the pre-drive and drive circuitry. A second circuit is used with the scheme to power a second load. This illustrates the convenience of independent adjustment of two outputs that originate from a single input. In this case, the two output curves can be adjusted independently according to the characteristics of the individual loads.

BEST MODE OF CARRYING OUT INVENTION

Figure 1:
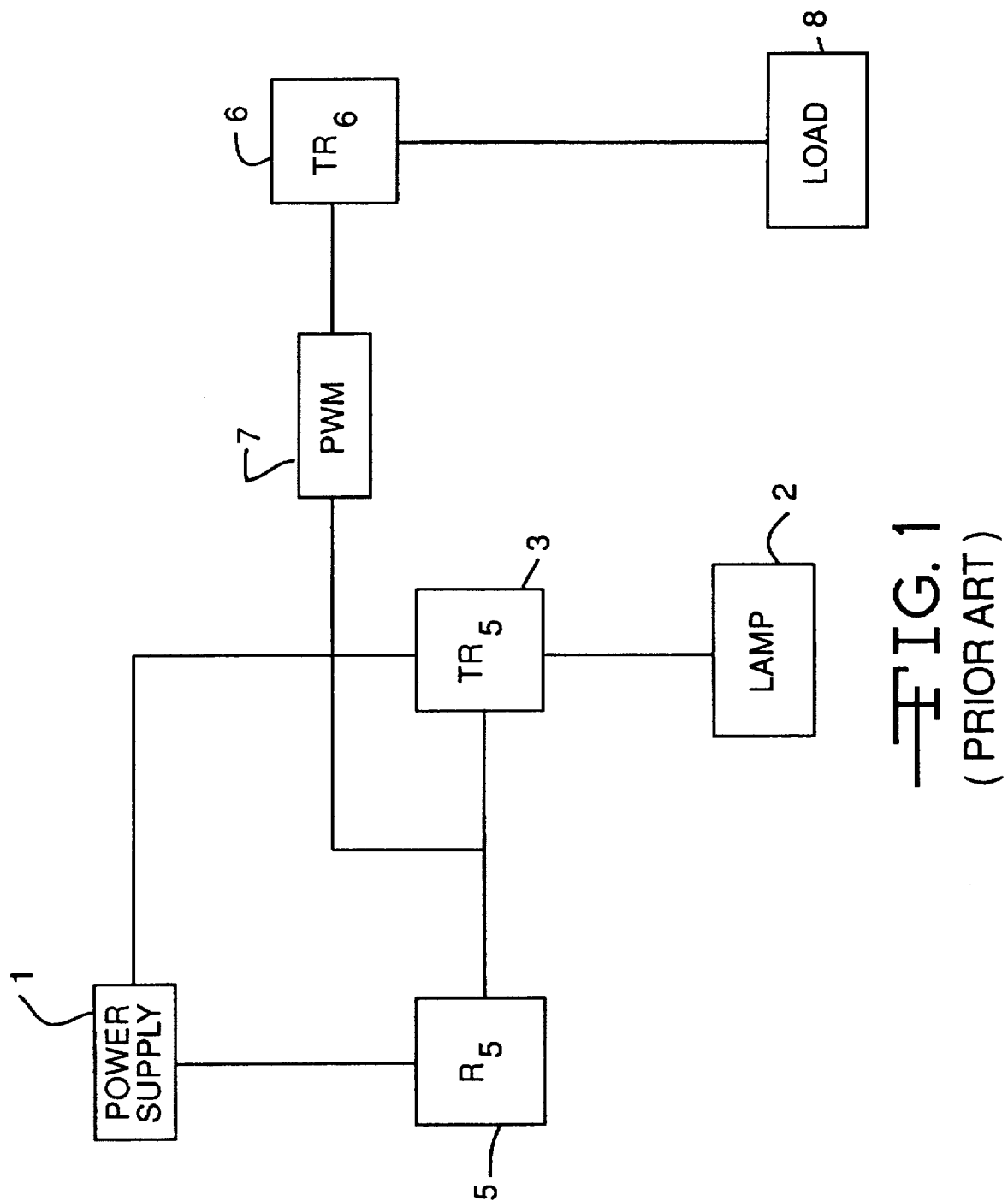
FIG. 1 is a circuit diagram showing for a prior art circuit for a lighting system of a motor vehicle.
Figure 2:
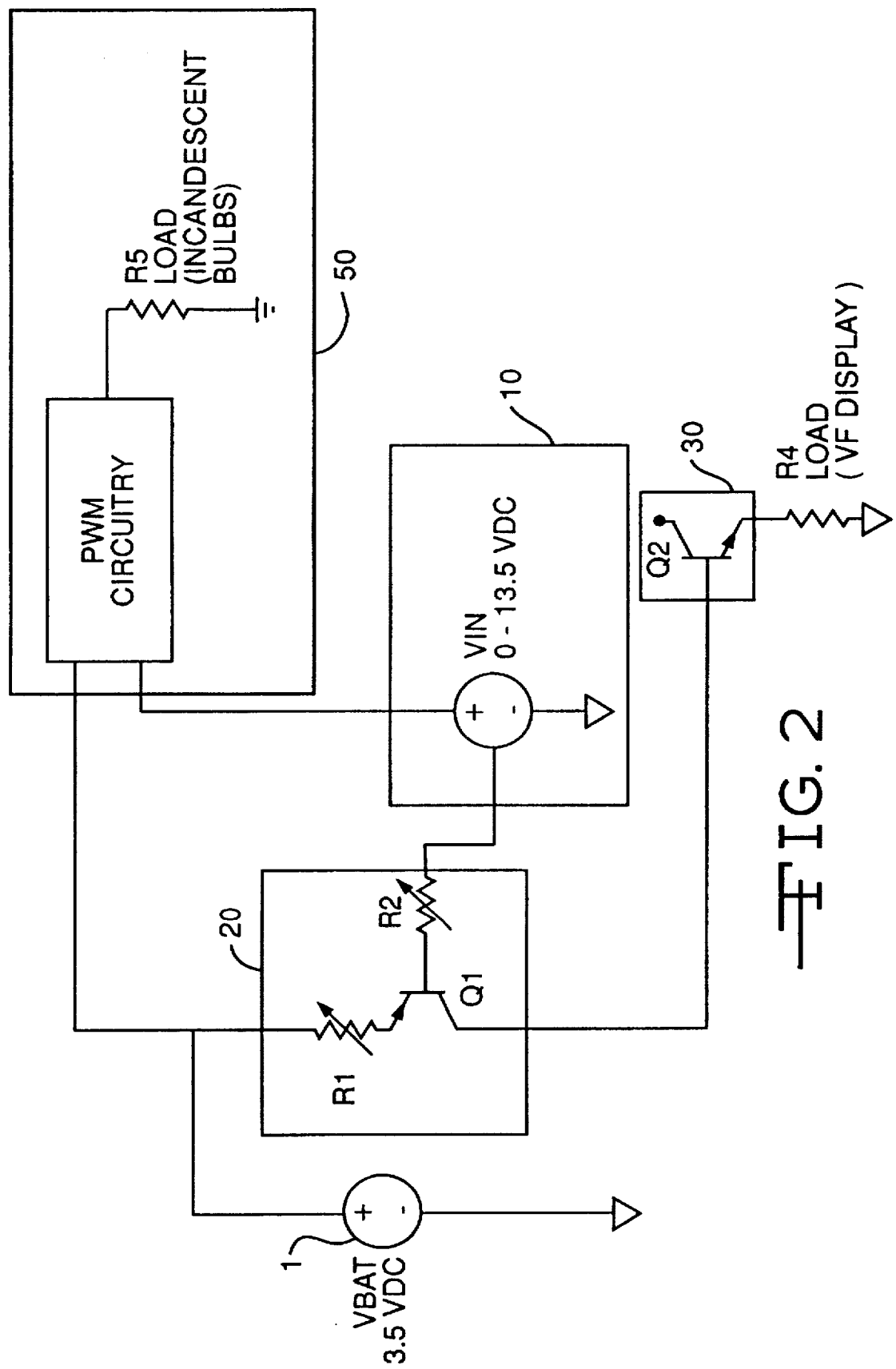
FIG. 2 is a block and circuit diagram of the circuit of our invention.

In the circuitry of this invention, FIG. 2 shows a variable DC voltage input 10 controlling a pre-drive section 20 through an input resistor $R_2$. The value chosen for $R_2$, along with $R_1$, determines the gain of the pre-drive circuitry. The available gain controls the base current into the output driver 30 which, in turn, controls an output voltage to the load $R_4$. The shape of the output curve is controlled by the available gain of both the pre-drive 20 and drive 30 circuitry. $R_1$ in the pre-drive circuitry supplies the power from 12 volt battery 1 to pre-driver 20. PWM circuitry 50 shown illustrates the convenience of independent adjustment of two outputs that originate from a single control input 10. In this case, the two output curves for load $R_4$ and load $R_5$ can be adjusted independently according to the characteristics of the individual loads.

This output scheme allows for output slope variation which can be utilized to better meet individual customer lighting curve requirements. The ability to vary the slope also allows for better illumination tracking between two separate sources of illumination, such as incandescent and VF displays. One example of our circuitry's use is using the PWM circuitry to illuminate the panel bulbs in the vehicle and the DC output to provide a voltage to the radio dial. One control 10 and our circuitry controls both loads. The use of a PNP bipolar transistor as a pre-drive allows for large output slope variability based on the values of resistors $R_1$ and $R_2$ used. This variability can be used to obtain better illumination tracking between the PWM and DC outputs.

The preferred embodiment of this invention is an electrical circuit for a motor vehicle comprising a power supply 1, a load $R_4$ energized by a first amount of power supplied by the power supply, a driver 30 for controlling the amount of power supplied to the load $R_4$, the driver being connected between the power supply and the load, a pre-driver 20 for supply the amount of power supplied to driver 30, pre-driver 20 being connected between the power supply 1 and the driver 30, wherein pre-driver 20 comprises a first resistor $R_1$ and a transistor $Q_1$, power supply 1 being connected to first resistor $R_1$, first resistor $R_1$ being connected transistor $Q_1$ and transistor $Q_1$ being connected to driver 30, and a second connection between variable voltage input 10 and the pre-driver 20 for controlling pre-driver 30, wherein the second connection includes a second resistor $R_2$, the second resistor $R_2$ being connected between control 10 and transistor $Q_1$.

In the preferred electrical circuit, control 10 is a variable voltage input. Control 10 also could be rheostat switch or a potentiometer.

Driver 30 comprises a transistor $Q_2$, transistor $Q_2$ being connected between pre-driver 20 and load $R_4$. Load $R_4$ typically is a VF display. Second load $R_5$ typically is incandescent bulbs and second driver 50 is PWM circuitry. PWM circuitry is connected between power supply 1 and load $R_5$. Control 10 is a variable voltage input controller which controls the amount of power the PWM circuitry supplies the incandescent bulbs. In this example, load $R_4$ has an illumination level and load $R_5$ has a different illumination level. Control 10 controls pre-driver 20 and PWM circuitry 50. Using this scheme controls the two output curves by independently adjusting the individual loads.

We claim:

1. An electrical circuit for a motor vehicle comprising:
   a power supply;
   a first load energized by an amount of power supplied by the power supply wherein the first load has an illumination level;
   a first driver for supplying the amount of power supplied to the first load, the first driver connected between the power supply and the first load;
   a pre-driver for supplying the amount of power supplied to the first driver, the pre-driver being connected between the power supply and the first driver;
   a control for controlling the amount of power the pre-driver supplies the first driver wherein the control is connected between the power supply and the pre-driver;

a second load energized by an amount of power supplied by the power supply wherein the second load has an illumination level different from the illumination level of the first load; and a second driver for supplying the amount of power supplied to the second load, the second driver connected between the power supply and the second load, wherein the control also is connected between the power supply and the second driver, and wherein the control also controls the amount of power the second driver supplies the second load.

2. An electrical circuit according to claim 1 wherein the control is a variable voltage input controller.

3. An electrical circuit according to claim 1 wherein the control is a rheostat switch or a potentiometer.

4. An electrical circuit according to claim 1 wherein the pre-driver comprises a resistor and a transistor, the power supply connected to the resistor, the resistor being connected to the transistor and the transistor being connected to the first driver.

5. An electrical circuit according to claim 4 wherein the pre-driver includes a second resistor, the second resistor connected between the control and the transistor of the pre-driver.

6. An electrical circuit according to claim 1 wherein the driver comprises a transistor, the transistor being connected between the pre-driver and the load.

7. An electrical circuit according to claim 1 wherein the first load is a VF (vacuum flurescent) display, the second load is incandescent bulbs and the second driver is PWM circuitry.

8. An electrical circuit according to claim 7 wherein the control is a variable voltage input controller which controls the amount of power the PWM circuitry supplies the incandescent bulbs.

9. An electrical circuit for a motor vehicle comprising:

a power supply;

a first load energized by an amount of power supplied by the power supply wherein the first load has an illumination level;

a first driver for supplying the amount of power supplied to the first load, the first driver connected between the power supply and the first load;

a pre-driver for supplying the amount of power supplied to the first driver, the pre-driver connected between the power supply and the first driver wherein the pre-driver comprises a resistor and a transistor, the power supply connected to the resistor, the resistor connected to the transistor and the transistor being connected to the driver;

a variable voltage input control for controlling the amount of power the pre-driver supplies the first driver wherein the control is connected between the power supply and the pre-driver and wherein the pre-driver includes a second resistor, the second resistor connected between the control and the transistor of the pre-driver;

a second load energized by an amount of power supplied by the power supply wherein the second load has an illumination level different from the illumination level of the first load; and a second driver for supplying the amount of power supplied to the second load, the second driver connected between the power supply and the second load, wherein the control also controls the amount of power the second driver supplies the second load, the control connected between the power supply and the second load.

10. An electrical circuit according to claim 9 wherein the first driver comprises a transistor, the transistor connected between the pre-driver and the first load.

11. An electrical circuit according to claim 9 wherein the first load is a VF display, the second load is incandescent bulbs and the second driver is PWM circuitry.

* * * * *